June 8, 1937. G. F. YAGER ET AL 2,082,929
METALWORKING MACHINE
Filed April 24, 1935 6 Sheets-Sheet 1

FIG.I.

INVENTORS
GEORGE F. YAGER
OLIVER J. HEATH
HAROLD E. WAGNER
BY
ATTORNEYS

June 8, 1937.　　G. F. YAGER ET AL　　2,082,929

METALWORKING MACHINE

Filed April 24, 1935　　6 Sheets-Sheet 2

INVENTORS
GEORGE F. YAGER
OLIVER J. HEATH
HAROLD E. WAGNER

BY

ATTORNEYS

June 8, 1937.　　G. F. YAGER ET AL　　2,082,929
METALWORKING MACHINE
Filed April 24, 1935　　6 Sheets-Sheet 5

INVENTORS
GEORGE F. YAGER
OLIVER J. HEATH
HAROLD E. WAGNER
BY
ATTORNEYS

June 8, 1937.  G. F. YAGER ET AL  2,082,929
METALWORKING MACHINE
Filed April 24, 1935  6 Sheets-Sheet 6
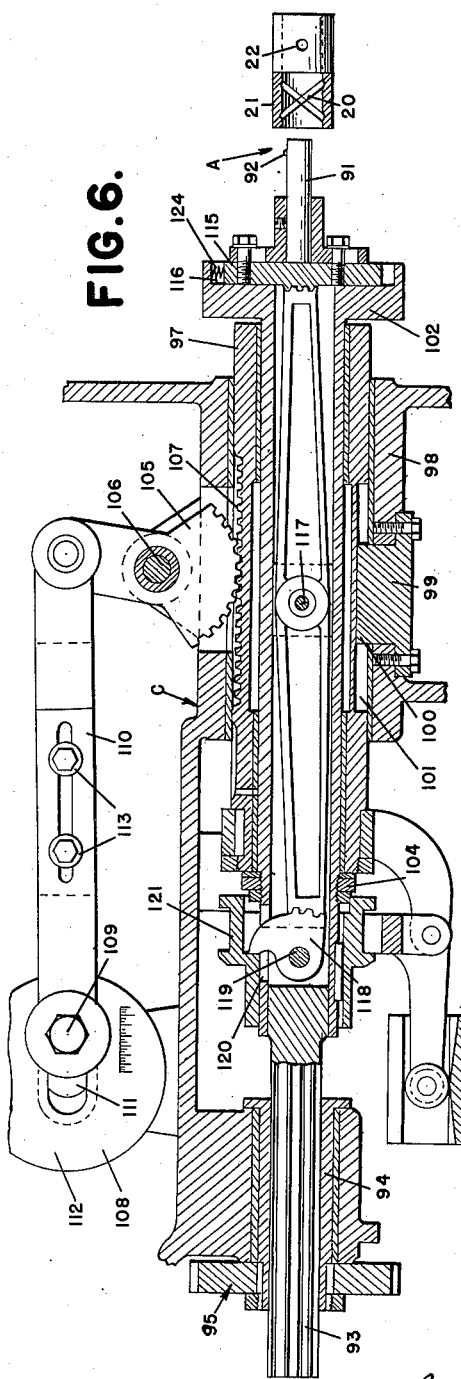
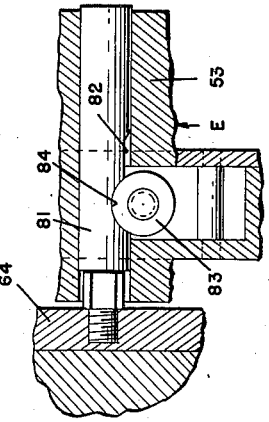
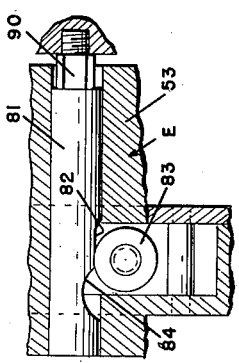
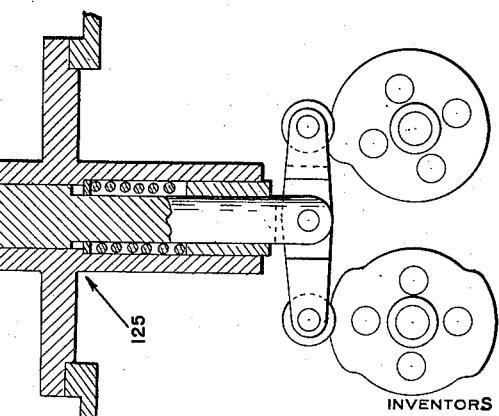
INVENTORS
GEORGE F. YAGER
OLIVER J. HEATH
HAROLD E. WAGNER
BY
ATTORNEYS Patented June 8, 1937

2,082,929

UNITED STATES PATENT OFFICE 2,082,929

METALWORKING MACHINE

George F. Yager, Oliver J. Heath, and Harold E. Wagner, Toledo, Ohio, assignors to The Bunting Brass and Bronze Company, Toledo, Ohio, a corporation of Ohio Application April 24, 1935, Serial No. 18,046

23 Claims. (Cl. 29—38)

This invention relates generally to metal working machines and refers more particularly to improvements in apparatus of the type employed in fashioning bushings or like members.

One of the principal objects of this invention is to provide a relatively simple machine completely automatic in operation, and equipped with a plurality of work forming devices adapted to perform different operations on a plurality of bushings simultaneously.

Another object of this invention resides in the provision of a machine having means for holding a plurality of bushing blanks in registration with one station and having mechanism at the latter station simultaneously performing a predetermined operation on each bushing. More specifically, the invention contemplates a machine having means for holding a plurality of bushing blanks in registration with each of a plurality of work stations and having devices at each of said stations operable simultaneously to perform different operations on each bushing.

Another object of this invention resides in the provision of a machine having a workholder for holding a plurality of bushing blanks in axial alignment with respect to each other at one station comprising a plurality of devices operable simultaneously to perform different functions on each bushing blank and, in addition, having means at the station automatically operable in timed relation to the devices for advancing the bushing blanks in the direction of their axes to not only successively register the bushing blanks with each of said devices, but to also introduce a new blank into the workholder and to eject a completed bushing from the workholder.

A further advantageous feature of this invention resides in the provision of a machine of the type set forth in the preceding paragraph, wherein the workholder is reciprocated in timed relation to the operation of the devices from a position in registration with the latter to a position in operative relation to the loading means, permitting the latter means to operate in the manner previously set forth, and wherein the reciprocation of the workholder is also timed with respect to the operation of the loading means to move the bushing blanks carried by the workholder back into registration with the work performing devices.

In addition to the foregoing, the present invention contemplates a machine having a workholder equipped with clamps operable to hold a plurality of sets of bushing blanks with the blanks in each set in axial alignment with respect to each other, and having means for automatically actuating the clamps in timed relation to the reciprocation of the workholder.

The foregoing, as well as other objects, will be made more apparent as this description proceeds, especially when considered in connection with the accompanying drawings, wherein:

Figure 6 is an enlarged sectional view taken substantially on the plane indicated by the line 6—6 of Figure 3;

Figure 8 is a sectional view taken substantially on the line 8—8 of Figure 7;

Figure 9 is a sectional view similar to Figure 8 showing the parts in a different position; and Figure 10 is a sectional view taken substantially on the line 10—10 of Figure 4.

Figure 1:
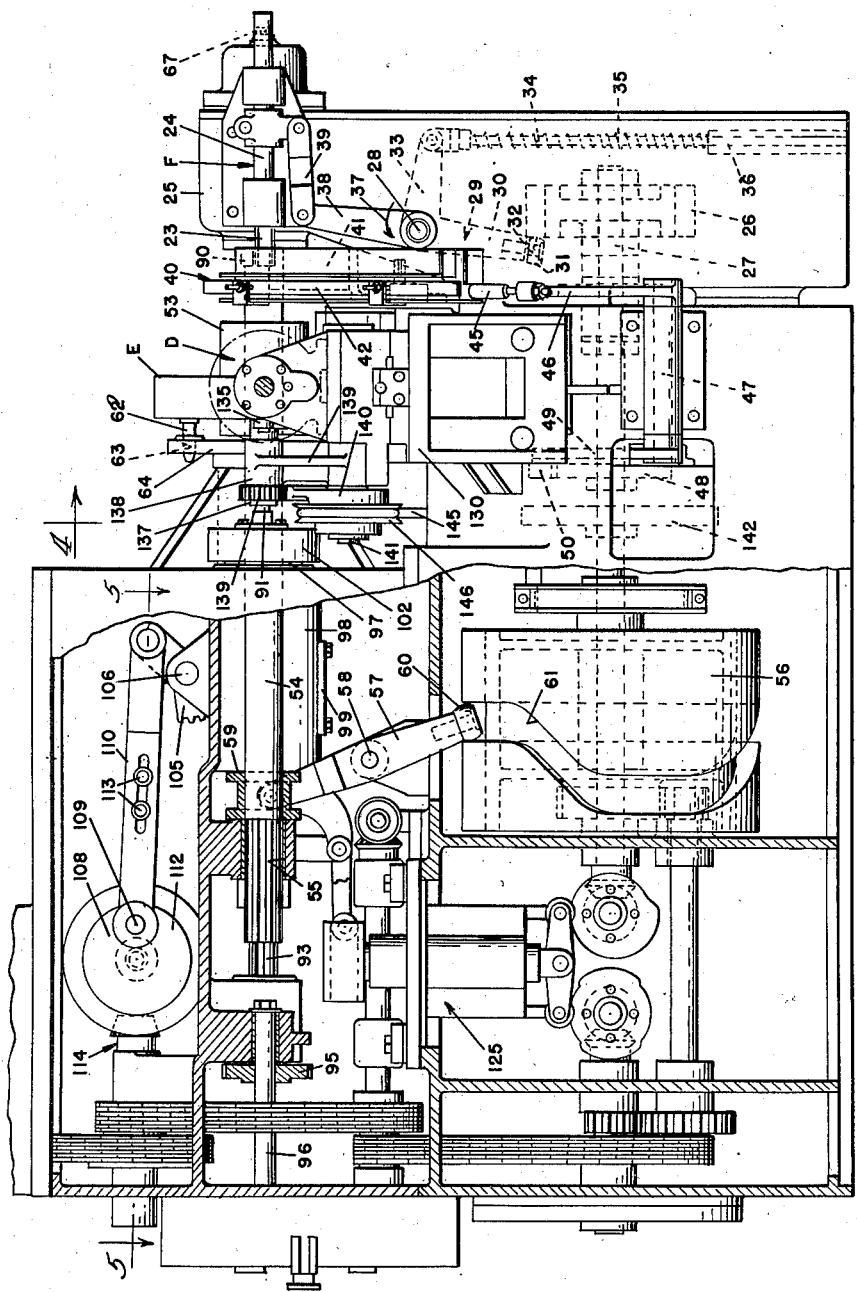
Figure 1 is a side elevational view of the machine with certain parts broken away for the sake of clearness.

Generally described, the machine selected herein for the purpose of illustration comprises two work performing stations A and B located diametrically opposite each other, and each comprising a grooving device C and a drilling head D. The grooving devices C are for the purpose of forming the oil grooves 20 in the bushings 21, while the drilling heads D operate to form the openings 22 through the bushings in communication with the oil grooves 20. In the present instance, two bushing blanks are supported at each station in axial alignment with each other, and the drilling heads D of both stations operate to simultaneously drill the openings 22 through one bushing of each pair, while the grooving devices C operate simultaneously to groove the remaining bushings of each pair.

The bushings are supported at their respective stations in operative relation to the aforesaid work performing devices by a non-rotatable axially reciprocable workholder E movable automatically, upon completion of the work performed by the aforesaid devices, from a position in registration with the latter to a position in operative relation with the loading mechanism F and equipped with bushing clamps G actuated automatically in timed relation to the reciprocation of the workholder. As will be more fully hereinafter set forth, the clamps G release the bushings upon movement of the workholder into juxtaposition with relation to the loading mechanism F and operate to clamp the bushings upon return-movement of the workholder into operative relation to the work performing devices.

The loading mechanism F comprises plungers movable in timed relation to the operation of the aforesaid clamps to introduce a new bushing blank into each clamp and to eject a completed bushing from each clamp. Inasmuch as two bushing blanks are supported in each clamp, it necessarily follows that the operation of the loading mechanism previously set forth, performs the additional function of advancing the bushing blanks with relation to the work performing devices. In this connection, it will be noted that the first bushing blanks admitted to each clamp are drilled by the devices D at each station, and that these bushing blanks are advanced at the next cycle of operation to a position in registration with the grooving devices C fashioned to form the oil grooves 20 in the bushings in registration with the previously drilled openings. In other words, the bushing blanks at each station are successively advanced into operative relation with the work performing devices, and the means for advancing the same comprises the loading mechanism.

Loading mechanism F

The loading mechanism F comprises a pair of plungers 23 supported on diametrically opposed sides of the axis of reciprocation of the workholder E in alignment with the clamps G carried by the workholder, and each of the plungers is secured to a slide 24 mounted for reciprocation toward and away from the workholder. In the present instance, the slides 24 are mounted on opposite sides of a housing 25 and are reciprocated by means of a cam 26 secured to a cam shaft 27, which in turn is journaled on the frame of the machine in any suitable manner.

The operative connection between the cam 26 and the slides 24 comprises a rockshaft 28 having a bell crank lever 29 secured thereto intermediate the ends of the same. The extremity of the arm 30 of the bell crank lever carries a cam follower in the form of a roller 31 adapted to engage the cam surface 32 of the cam 26, and the extremity of the other arm 33 of the bell crank is normally urged in a direction to maintain the cam follower in frictional contact with the surface 32 by means of a compression spring 34. As shown in Figure 1, the compression spring 34 surrounds a rod 35 having the upper end pivotally connected to the extremity of the arm 33 of the bell crank 29 and having the lower end slidably supported in a bushing 36 fixed in any suitable manner to the frame of the machine. The spring 34 is arranged under compression between the upper end of the bushing and the extremity of the arm 33 of the bell crank 29, with the result that the latter is normally urged in a direction to yieldably maintain the cam follower 31 into frictional engagement with the cam surface 32. With the construction as thus far described, it will be apparent that as the dwell in the cam surface registers with the follower 31 the shaft 28 will be rocked in the direction of the arrow 37. This rocking motion of the shaft 28 is converted into a sliding movement of the two plungers 23 by means of a pair of levers 38 having the lower ends fixed to the rockshaft 28 and having the upper ends respectively pivotally secured to the inner ends of a pair of links 39. The outer ends of the links 39 are pivotally secured to the slides 24 in order to effect simultaneous movement of both slides inwardly upon rocking the shaft 28 in the direction of the arrow 37. It will, of course, be understood that the cam surface 32 is accurately predetermined to actuate the plungers 23 in timed relation to the reciprocation of the workholder E. In other words, the arrangement is such that after the workholder E is moved to a position adjacent the loading mechanism, the plungers 23 automatically move rearwardly, or in a direction toward the workholder, and when the latter is returned to its initial position the plungers are also returned to their normal position.

The loading mechanism also comprises means for conveying bushing blanks to a position between the plungers 23 and the clamps G on the workholder. The aforesaid means comprises a pair of chutes 40 of the combined plunger and gravity feed type. The chutes are secured to opposite sides of the machine frame through the medium of suitable brackets 41, and the width of the chutes approximates the length of one bushing blank. In detail, both chutes are provided with upwardly extending portions 42 terminating at the upper ends in inwardly extending downwardly inclined portions 43. The inner extremities of the portions 43 are provided with stops 44 accurately predeterminedly positioned to support the bushing blanks between the plungers 23 and the clamps G in alignment with both of the latter, so that when the plungers are moved in a direction toward the workholder, they will operate to transfer a bushing from each of the chutes into the associated clamps G.

The bushings are moved along the upwardly extending portions 40 of the chutes to the downwardly inclined portions 43 by means of plungers 45 positioned adjacent the lower ends of the chutes for engagement with the lowermost bushing blank in each chute. Each of the plungers 45 are in turn carried by the outer extremities of suitable arms 46 having the inner ends secured to rockshafts 47 journaled upon opposite sides of the machine frame and operatively connected to a cam 48 secured to the cam shaft 27. The operative connections between the rockshafts 47 and cam 48 comprise levers 49 having their outer ends fixed to the rockshafts and carrying cam followers 50 at the inner extremities thereof normally urged into frictional engagement with the cam by means of the springs 51. It will, of course, be understood that the cam 48 is accurately formed to operate both of the plungers 45 in timed relation to the operation of the transfer plungers 23 so as to insure the presence of bushing blanks in alignment with the transfer plungers each time the latter operate.

As briefly pointed out above, the transfer plungers 23 not only supply the bushing blanks to the clamps G on the workholder and advance the bushing blanks in these clamps to successively position the bushings in registration with the drilling and grooving devices, but also function to eject the bushings from the clamps on the

Workholder assembly and actuating means therefor

The workholder E is provided with a hub 53 secured to a reciprocable shaft 54 having one end slidably supported in the housing 25 and having the opposite end splined for slidably engaging a correspondingly splined bushing 55 fixed in any suitable manner to the machine frame. The shaft 54 is reciprocated by a cam 56 secured to the cam shaft 27, through the medium of a rock arm 57 pivotally mounted on the machine frame intermediate the ends thereof as at 58. The upper end of the arm 57 engages a collar 59 detachably secured to the shaft 54, while the lower end of the arm carries a cam follower 60 for engagement in the cam groove 61 of the cam. The configuration of the cam grove 61 is accurately predetermined to reciprocate the shaft 54, and accordingly, the workholder E in timed relation to the operation of the work performing devices at the two stations A and B. In other words, the cam groove 61 is designed to move the workholder E axially toward the loading mechanism F immediately upon completion of the drilling and grooving operations at the stations A and B. Moreover, the cam groove 61 functions to return the workholder E to the position thereof shown in Figure 1, wherein the bushing blanks carried by the clamps G on the workholder register with the work performing devices at the aforesaid stations as soon as the loading mechanism completes its operation.

It is important for the workholder E to assume an exact predetermined position with respect to the work performing devices at the two stations previously mentioned, and in order to insure such a result, pilots 62 are secured to the rear face of the workholder in positions to accurately fit within openings 63 formed in a positioning plate 64 rigidly secured to the machine frame. It will be apparent from Figure 1, that the pilots enter the openings 63 in the positioning plate 64 upon completion of the return-movement of the workholder E, and accordingly, accurate positioning of the bushing blanks carried by the workholder relative to the work performing stations is insured. It will further be observed that due to the close fit provided between the pilots and the side walls of their respective openings, any tendency for the workholder to rock slightly during the grooving or drilling operations will be prevented.

Figure 3:
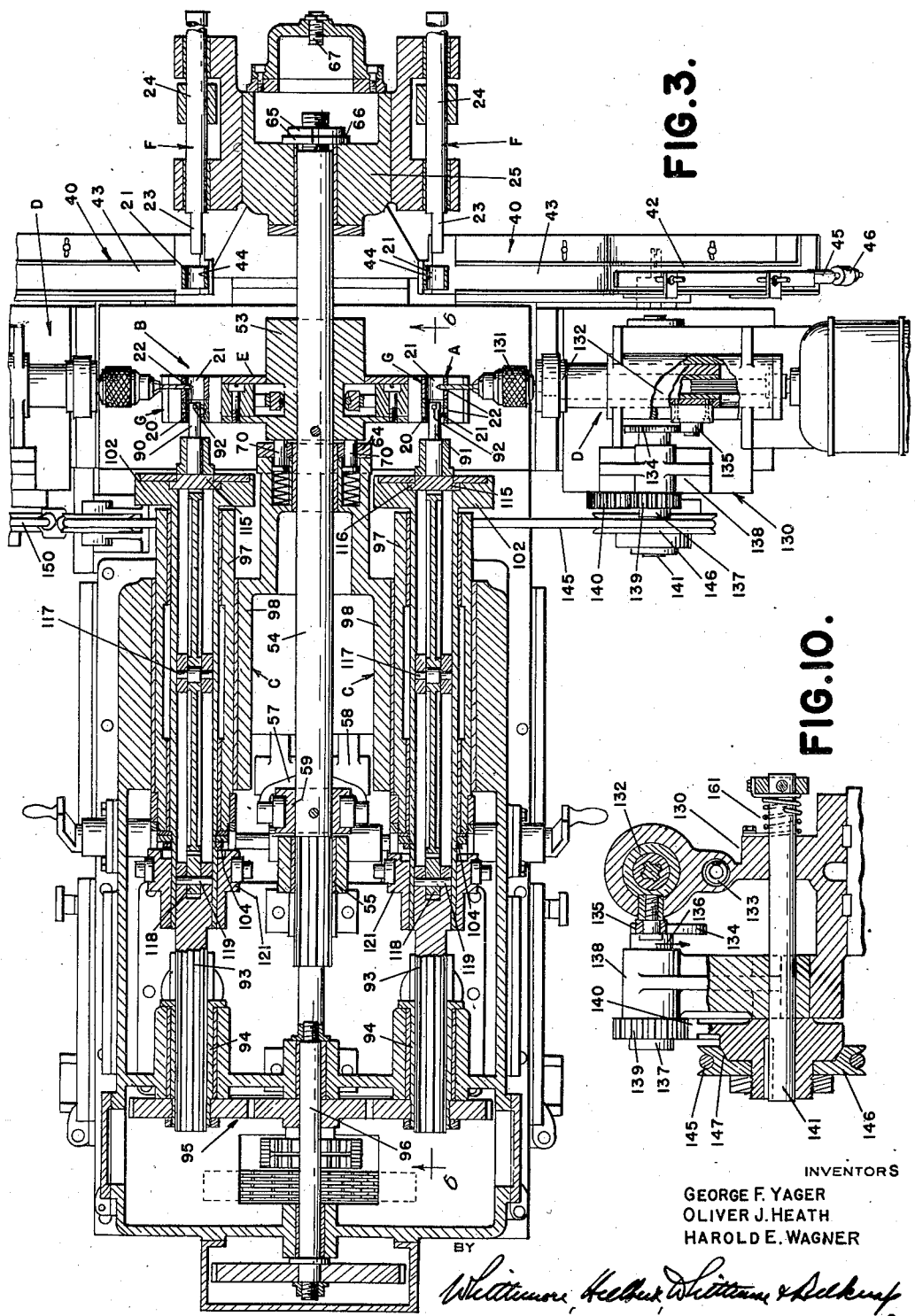
Figure 3 is a horizontal sectional view taken substantially on the plane indicated by the line 3—3 of Figure 2 showing the work performing devices at the several stations in their operative positions.

It may also be desired to vary the position of the workholder E with reference to the work performing devices at the aforesaid stations, and this is accomplished in the present instance by providing mechanism rendering it possible to adjust the shaft 54 endwise. As shown in Figure 3, when it is desired to move the workholder E relative to the stations, the collar 59 is released from the shaft 54 and the required adjustment may then be effected by manipulating either the adjusting nuts 65 or the screw 67. In the event it is desired to adjust the workholder E in a direction toward the station F, the workholder is located in its operative position by the cam 56, whereupon the collar 59 is released from the shaft 54 and the nuts 65 are actuated to coact with the shoulder 66 on the housing to effect the required adjustment. On the other hand, when it is desired to adjust the workholder in the opposite direction, the work holder is moved into registration with the loading station F by the cam 56, whereupon the collar 59 is released and the required adjustment is effected by manipulation of the screw 67. Attention may be called to the fact at this time, that the workholder E is normally yieldably urged in a direction toward the loading station F so as to render it possible to maintain an accurate adjustment of the workholder irrespective of any slight end-play that may exist in the construction. The foregoing is accomplished herein by a series of spring-pressed plungers 70 slidably mounted upon the machine frame in the manner shown in Figure 3, and normally yieldably maintained into engagement with the end of the hub 53 adjacent the positioning plate 64.

Clamps "G" and operating means therefor

Figure 7:
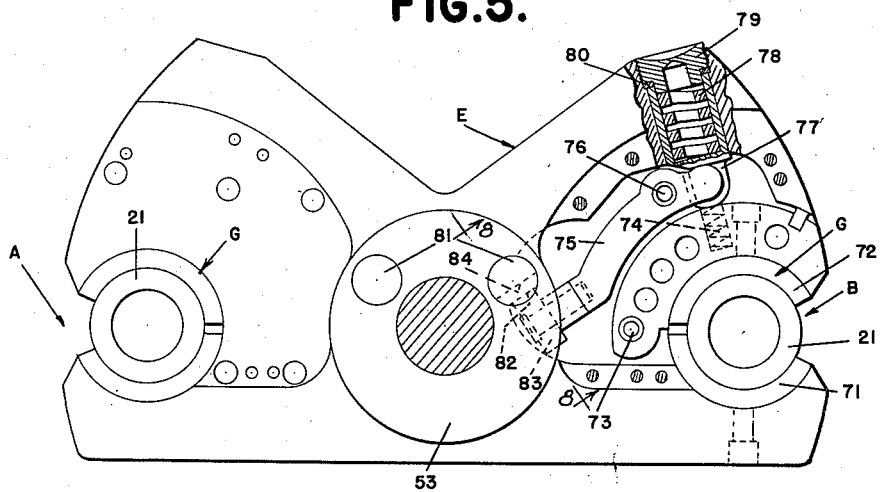
Figure 7 is a detail view of the work holding turret.

The clamps G and operating means therefor actually form a part of the workholder assembly, as shown in Figure 7. As previously indicated, each of the clamps is of sufficient length to hold two bushings in axial alignment with each other, and these clamps are automatically actuated. In detail, each of the clamps G comprises a stationary section 71 and a relatively movable section 72 cooperating in their innermost positions to grip a pair of bushings therebetween. The relatively movable section 72 of each clamp, in effect, comprises an arm pivotally connected as at 73 by a pin having its axis intersecting a line passing through the centers of both clamps and passing through the axis of rotation of the workholder. The movable section 72 of each clamp is normally urged in a direction toward the cooperating stationary section 71 by means of a relatively weak spring 74 insufficient in itself to prevent displacement of the bushings in the clamp by the transfer plungers 23, but merely operable to exert a slight pressure on the bushings sufficient to prevent accidental displacement of the same during the releasing movements of the workholder. The movable section 72 of each clamp is forcibly operated to effect the clamping action, by means of a lever 75 pivotally supported adjacent the outer end by a pin 76 and having the extreme outer end engaging a plunger 77 slidably supported within the workholder for limited radial travel with respect to the center of the associated clamp. As shown in Figure 7, the portion of the plunger slidably supported in the workholder is cup-shaped or recessed to receive a relatively heavy spring 78, and this spring is held in assembled relationship with the plunger by means of a cap 79 having an annular shoulder portion 80 forming a stop for limiting the outward travel of the plunger. It will be observed from the foregoing, in connection with Figure 7, that the springs 78 urge the plungers 77 into engagement with the outer extremities of the arms 75 tending to rock the arms about the pivots 76 in a direction to move the sections 72 of the clamps toward the stationary sections 71. Rocking movement of the arms 75 under the action of the springs 78 is controlled by means of the pins 81 slidably mounted in the hub 53 of the workholder for movement in directions parallel to the axis of reciprocation of the workholder. As shown particularly in Figure 8, each of the pins 81 is provided with a cam surface 82 for engaging a roller 83 mounted upon the inner extremity of each of the arms 75 and, in addition, each of the pins is provided with a substantially semi-circular recess 84 in advance of the cam surface and corresponding in radius to the radius of the roller 83, so as to receive a portion of the same.

The foregoing construction is such that when the rollers 83 at the inner extremities of the arms 75 are within the recesses 84, the springs 78 operate to yieldably urge the sections 72 of the clamp toward the cooperating stationary sections 71 with a force sufficient to rigidly clamp the bushings between these sections. Consequently, when the workholder E is in its operative position with respect to the work performing devices at the stations A and B, the pins 81 assume the positions, as illustrated in Figure 9, wherein the substantially semi-circular recesses 84 are opposite the rollers 83, or in other words, receive a portion of these rollers. Inasmuch as it is essential to release the clamps upon movement of the workholder E in registration with the loading mechanism F, provision is made for shifting the pins 81 axially in a direction opposite to the direction of movement of the workholder so as to cam the rollers 83 out of engagement with the recesses 84 and into engagement with the cam surfaces 82. The aforesaid action of the rollers 83 causes the arms 75 to rock about the pins 76 in a direction to move the plungers 77 radially outwardly and thereby relieve the sections 72 of the clamps from the action of the springs 78.

The means indicated above for effecting the required axial movement of the pins 81 to release the clamps is illustrated in Figure 8 and comprises abutments 90 fixedly secured to the machine frame in the path of travel of the pins 81. The location of the abutments 90 is accurately predetermined so that the clamps are released prior to the actuation of the transfer plungers 23 to accomplish their functions previously described. It is, of course, necessary after the operation of the transfer plungers 23 to again actuate the clamps and this is automatically accomplished as the workholder E is returned to its operative position, by providing means for shifting the pins 81 in the direction required to locate the substantially semi-circular recesses 84 opposite the rollers 83. Obviously, as soon as the recesses 84 in the pins assume positions opposite the rollers 83, the springs 78 are permitted to actuate, through the medium of the plungers 77 to rigidly clamp the bushings in the workholder. In order to effect the shifting movement of the pins 81 necessary to register the rollers 83 with the semi-circular recesses 84, two fixed abutments, similar to the abutments 90, are mounted on the machine frame in alignment with the pins 81.

*Grooving devices "C"*

As previously indicated, a grooving device C is located at each of the stations A and B for the purpose of forming an oil groove of the desired configuration in the bushings in registration with the openings previously formed by the drilling devices at these stations. Although any one of a number of different types of grooving devices may be successfully employed, nevertheless, for the purpose of simplicity, the grooving devices shown herein are exactly the same in construction and operation to the ones featured in the Yager and Heath copending application Serial No. 639,354, filed October 24, 1932.

As indicated above, the grooving devices at the two stations are exactly the same in construction, and accordingly, only one of the grooving devices will be described in detail herein. As shown in Figure 6, the grooving device comprises a boring bar 91 adapted to extend into the so-called second bushing carried by the workholder E and having a cutter 92 at the end thereof for forming the desired oil groove in the aforesaid bushing. It will, of course, be understood that the boring bar 91 is operated in timed relation to the actuation of the workholder E, so that as soon as the workholder is returned to its operative position with respect to both of the stations, the boring bars 91 of each grooving device function to form the desired groove in the second bushing located in each of the clamps G. It will be observed as this description proceeds, that the boring bar 91 is not only capable of simultaneous rotation and reciprocation, but is also adapted to be moved radially with respect to the bushings so as to feed the tool 92 into cutting engagement with the inner surfaces of the bushings.

In detail, the boring bar is carried by a shaft 93 having the rear end portion splined within a bushing 94, which in turn is journaled in a fixed part of the machine frame. In the present instance, the bushing 94 of one grooving device is operatively connected to the corresponding bushing of the other grooving device, through the medium of suitable gearing 95 driven by a suitable drive shaft 96. The gearing 95 is such that the shafts 93 of both boring devices will be rotated at exactly the same speed, through the medium of the bushings 94.

Inasmuch as the shaft 93 has a splined engagement with the cooperating bushing 94, it will be apparent that the shaft may also be reciprocated without interfering with the rotation thereof. As illustrated in Figure 6, the shaft 93 is tubular, with exception of the splined portion, and is journaled in a bushing 97, which in turn is slidably but non-rotatably mounted in a bearing 98 fixedly secured to the machine frame. The bushing 97 is prevented from rotation by means of a key 99 secured to the bearing 98 and having a portion 100 projecting into a slot 101 extending longitudinally of the bushing 97. The forward end of the bushing 97 engages the outer side of an enlarged head 102 formed on the inner end of the shaft 93, and the opposite end of the bushing engages a suitable jam nut 104 threaded upon the shaft 93, in the manner clearly shown in Figure 6. With the above construction, it will be apparent that reciprocation of the bushing 97 will effect a corresponding reciprocation of the shaft 93 and boring bar 91, irrespective of whether the latter are rotated or not.

Figure 5:
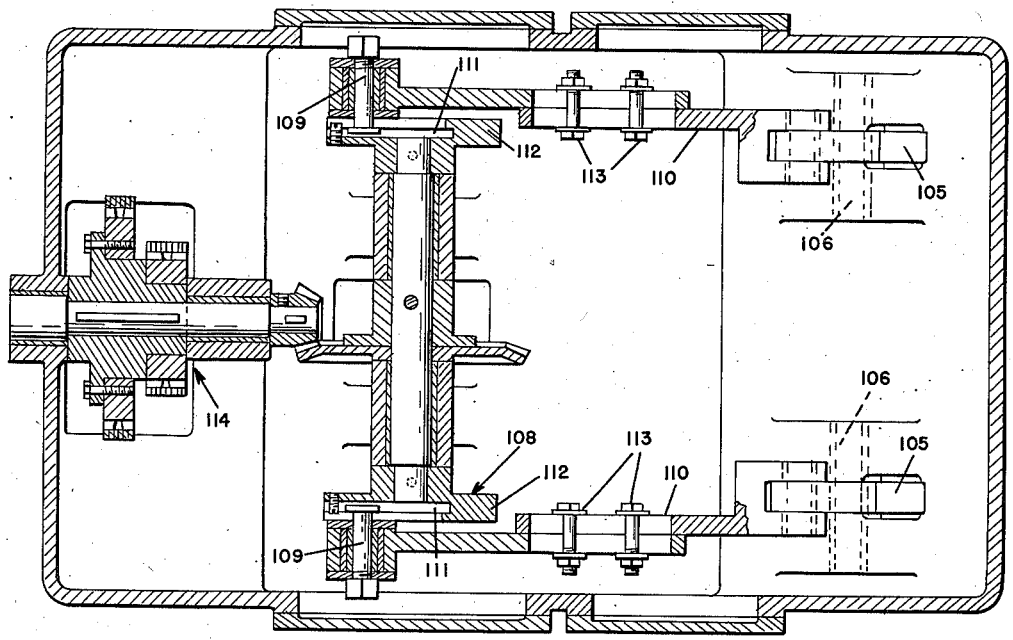
Figure 5 is an enlarged sectional view taken substantially on the plane indicated by the line 5—5 of Figure 1.

Reciprocatory movement is imparted to the bushing 97 at station A by means of a segmental pinion 105 mounted for oscillation about a pin 106 extending at right angles to the axis of rotation of the shaft 93 and having the teeth thereof fashioned to mesh with corresponding rack teeth 107 spaced longitudinally of the bushing. The gear segment 105 is oscillated about the pin 106 by means of a crankshaft 108 having a crank pin 109 at one end thereof operatively connected to the pinion through the medium of a connecting rod 110. As shown particularly in Figure 5, the crank pin 109 has a slotted connection 111 with the cheek 112 of the crankshaft, in order to permit the throw of the crank pin to be varied from zero to a predetermined maximum. It will also be observed from the above figure, that the connecting rod 110 is variable in length in that it is formed of two parts adjustably secured together as at 113. This adjustable connection is desirable in that it provides for accurately locating the reciprocatory stroke of the tool 92 relative to the work or bushing to be grooved. Attention is called to the fact at this point that the bushing 97 at station B is connected to the opposite end of the crankshaft 108 for reciprocation by means identical in nature to the means previously described. In other words, the grooving devices at both stations are reciprocated from a common crankshaft, and in the present instance, the crankshaft is rotated from a suitable source of power (not shown), through the medium of the gearing designated by the reference character 114.

It will, of course, be apparent that the tools 92 of the grooving devices must also be capable of radial movement in order to feed the same into engagement with the work to be grooved, and this is accomplished in the present instance by securing the boring bar 91 of each grooving device to a plate 115 mounted within a recess 116 formed in the inner face of the enlargement 102 on the shaft 93. This construction is shown in Figure 6, and as will be apparent from this figure, the plate and recess are such as to permit the former to be reciprocated in a plane extending at right angles to a horizontal plane, including the axis of rotation of the shaft 93. The particular means for actuating the plate forms no part of this invention, and accordingly, will not be described in detail. Briefly, however, a suitable rock arm is located within the shaft 93 for rocking movement about a pin 117 extending at right angles to the axis of rotation of the shaft, and the opposite ends of the rock arm are provided with teeth for respectively meshing with the teeth on the rear face of the plate 115 and with a gear segment 118. The gear segment 118 is rockably mounted in the shaft 93 about a pin 119 having its axis substantially parallel to the axis of the pin 117, and a portion of the segment projects out of the shaft through an elongated slot 120 therethrough. The construction is such that rocking movement of the segment in opposite directions about the axis of the pin 119 will effect a movement of the cutting tool 92 toward and away from the bushing through the medium of the plate 115. The required rocking movement of the segment 118 is obtained in the present instance by means of a collar 121 slidably, but nonrotatably mounted upon the shaft 93. As shown in Figure 6, the collar 121 is provided with an internal shoulder adapted to engage the portion of the segment projecting through the shaft 93, and the arrangement is such that movement of the collar inwardly with respect to the shaft 93 effects a movement of the cutting tool 92 radially outwardly into engagement with the bushing through the medium of the plate 115 and rock arm 117. On the other hand, when the collar 121 is moved outwardly with respect to the shaft, the cutting tool 92 is moved radially inwardly by the action of the spring 124 on the plate 115. In other words, the spring 124 maintains the projection on the gear segment into contact with the shoulder on the collar. Inasmuch as reciprocation of the collar controls the depth of cut, it necessarily follows that the movement of the collar must be accurately determined, and any suitable mechanism having the desired control may be employed for actuating the collar. In the present instance, this mechanism is designated generally herein by the reference character 125, which, although shown in Figure 6, forms no part of the present invention and will not be described. The timing of the operation of the grooving devices at both stations is accurately predetermined with respect to the operation of the other instrumentalities previously described. In other words, as soon as the workholder E is returned to the position thereof shown in Figure 3, the grooving devices operate to form the desired groove in the second bushings of each clamp, and the grooving devices complete their operation substantially simultaneously with the drilling devices acting upon the first bushings in each clamp.

*Drilling devices "D"*

Figure 2:
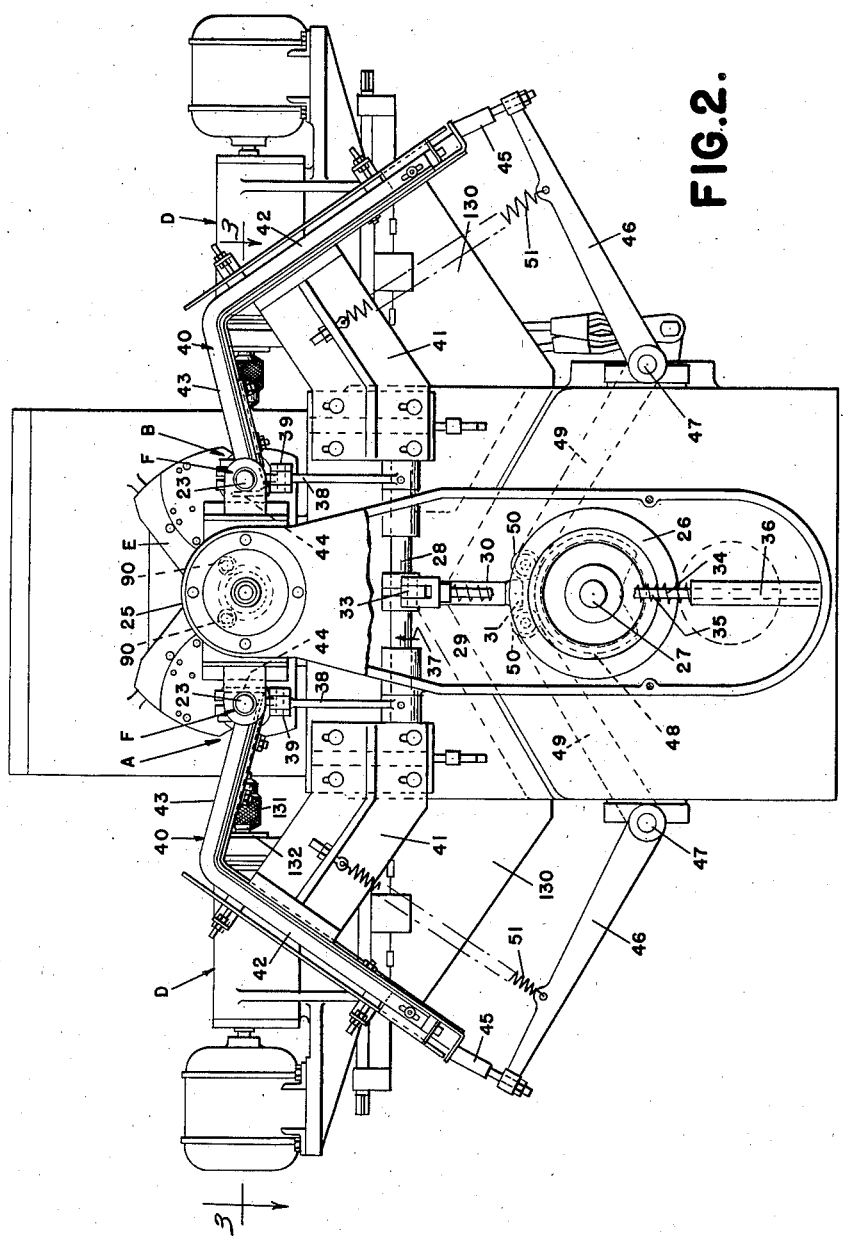
Figure 2 is an end elevational view of the machine shown in Figure 1 with parts broken away.
Figure 4:
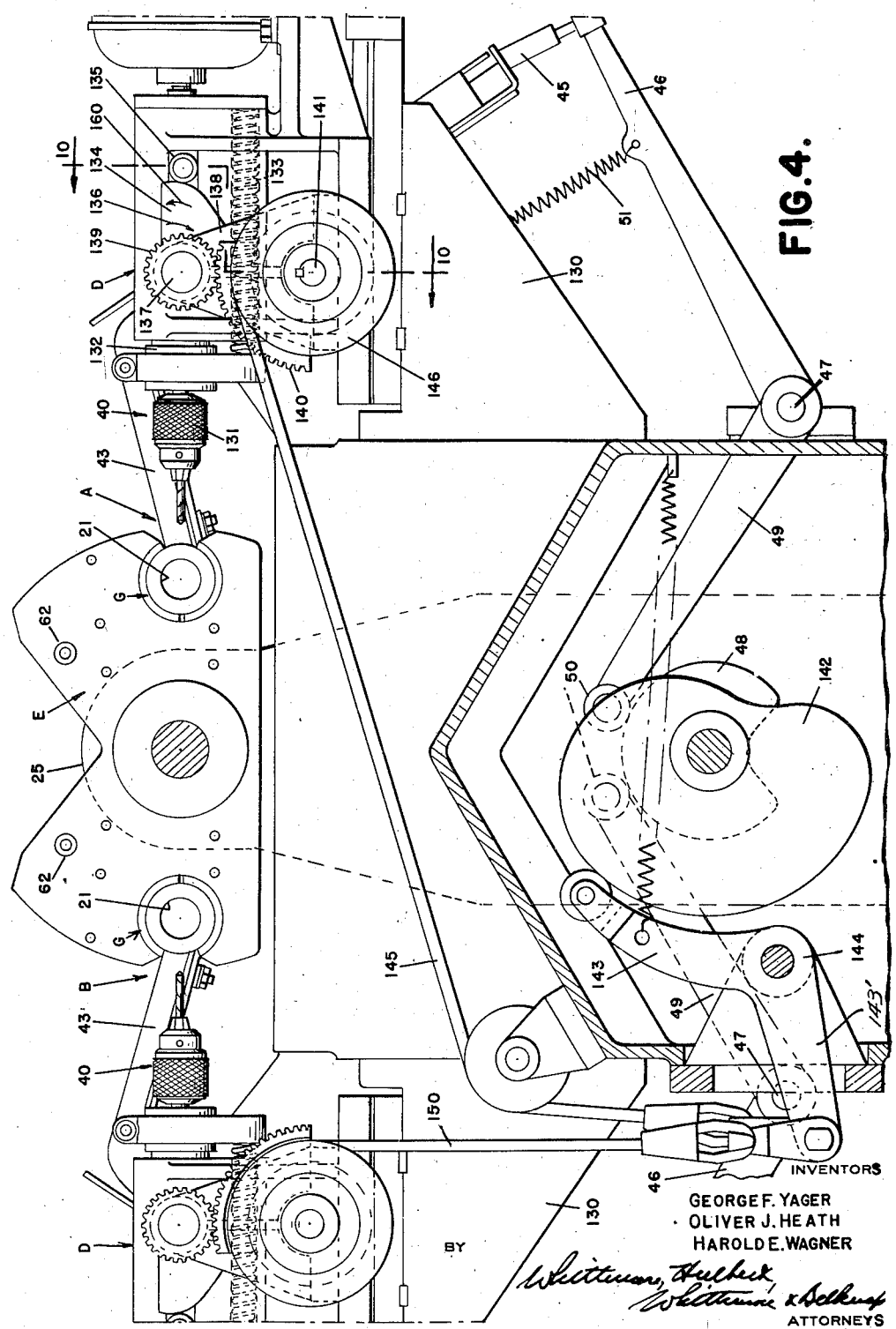
Figure 4 is an enlarged sectional view taken substantially on the line 4—4 of Figure 1.

The drilling devices D form the apertures in the bushing blanks prior to introducing these blanks to the grooving devices previously set forth, and operate simultaneously with the grooving devices. The particular construction of the drilling devices selected herein for the purpose of illustration forms no part of the present invention, and accordingly, will only be briefly described herein. As shown in Figure 2, the drilling devices are supported at the two stations upon brackets 130 extending laterally outwardly from opposite sides of the machine frame and both of the devices are capable of adjustment in order to provide for accurately locating the drills with respect to the bushing blanks. Inasmuch as both of the drilling devices are identical in construction and operation, only the one located at station A will be described. It will be observed from Figures 3 and 4 that the drilling device D at station A comprises a drill-holding chuck 131 carried by a quill 132 operatively connected to a suitable electric motor for rotating the drill, and mounted for movement toward and away from the bushing at station A. In the present instance, the quill is normally urged in a direction toward the work or bushing to be drilled by a coil spring 133, and is moved out of engagement or away from the work by a cam 134. The cam 134 is fixed against axial displacement by the quill and engages a roller 135 carried by the quill, in such a manner that rotation of the cam in the direction of the arrow 136 causes the quill and associated chuck to move in a direction away from the work against the action of the spring 133. In the present instance, the cam is secured to a shaft 137 journaled in a fixed bracket 138 and having a pinion 139 secured thereto. The pinion meshes with a gear segment 140, which in turn is secured to a rockshaft 141 also journaled in the fixed bracket 139. Rocking movement of the shaft in a direction to effect a rotation of the cam in the direction of the arrow 136 for retracting the drill is accomplished by means of a cam 142 having a cam face engaging one arm 143 of a bell crank lever 144 having the extremity of the other arm 143' secured to the lower end of a cable 145 having the upper end reeved around and secured to a pulley 146 connected to the shaft 141, through the medium of a suitable friction clutch 147. In this connection, it may be pointed out that the pulley of the drilling device at station B is also connected to the arm 143' of the bell crank lever 144 by a cable 150, so that downward movement of the bell crank lever by the cam will retract both of the drills.

In order to effect a rocking movement of the shaft 141 in the opposite direction and thereby rotate the cam 134 in the direction of the arrow 160 to permit the spring 135 to move the drill toward the work, a coil spring 161 is mounted on the shaft having one end fixed with respect to the shaft and having the opposite end secured to the shaft 141. The construction is such that when the shaft 141 is rotated in the direction to retract the drill against the action of the spring 135, the coil spring 161 is wound or tensioned so that as soon as the arm 143 of the bell crank registers with the dwell on the cam 142, the cable connecting the bell crank to the pulley 146 will become slack, permitting the spring 161 to revolve the shaft 141 in the opposite direction, or in a direction to cause the rotation of the cam 134 in the direction of the arrow 160.

Operation

Assuming that the workholder E is in the position thereof shown in Figure 1, and that the drilling and grooving devices at the two stations have completed their operations on the bushings held in the clamps G, it will be noted that the workholder E will be moved axially toward the loading mechanism F by the cam 56. As the workholder E approaches the loading mechanism F, the clamps are automatically released by displacement of the pins 81 in a direction opposite to the direction of movement of the workholder and as the workholder assumes a position adjacent the loading chutes 40, the cam 26 operates to move the plungers 23 toward the workholder. Movement of the plungers 23 in the aforesaid direction transfers a bushing from each of the loading chutes 40 into each of the clamps G on the workholder and advances the first bushing in each clamp in a direction toward the work performing stations A and B. Of course, movement of the first bushing in each clamp in the aforesaid direction ejects the second bushing in the clamps from the workholder. Upon completion of the loading operation, the workholder is returned by the cam 56 to its operative position shown in Figure 1, and as it approaches this position the clamps are actuated to grip the bushings therein by return-movement of the pins 81 in a manner previously set forth.

As soon as the workholder is in the position thereof shown in Figure 1, the drills of the drilling devices D are moved toward each other into engagement with the first bushings in each of the clamps, and the cutting tools 122 of the grooving devices C are operated to form an oil groove in the second bushing in each clamp. The drilling and grooving devices at each station operate simultaneously upon their respective bushings and as soon as they have completed their operations, the workholder E is again moved to a position adjacent the loading mechanism F, whereupon the foregoing functions are repeated.

Thus from the above, it will be apparent that we have provided a relatively simple and completely automatic machine for drilling apertures in the bushings and for forming oil grooves in communication with the apertures. It will further be apparent that the bushings are fashioned to provide the apertures and oil grooves at a rate considerably higher than it is possible to obtain with machines of the type heretofore commercially employed.

What we claim as our invention is:

1. In a metal working machine, a station comprising a plurality of work performing devices spaced from each other, means for holding a plurality of articles to be fashioned at said station with an edge of one article in juxtaposition to an edge of an adjacent article and with each article in registration with one of said devices simultaneously, means for actuating the devices to perform their respective operations on the articles in registration therewith, and means operable in timed relation to the operation of said devices for advancing articles through the work holding means to successively position the articles in registration with each of said devices.

2. In a metal working machine, a station comprising a plurality of work performing devices operable to perform different operations on the work, a work holding member equipped with means for holding a plurality of articles at said station with an edge of one article in juxtaposition to an edge of an adjacent article and with each article in operative relation to one of said devices, means for actuating the devices simultaneously to perform their respective operations on the articles in registration therewith, and means operable upon completion of the aforesaid operation of the devices to release the articles from the holder and to advance articles through the holding means to successively position the articles in operative relation to each of said devices.

3. In a metal working machine, a station comprising a plurality of work performing devices spaced from each other, means for holding a plurality of articles to be fashioned at said station with an edge of one article in juxtaposition to an edge of an adjacent article and with each article in registration with one of said devices, means for actuating the devices simultaneously to perform their respective operations on the articles in registration therewith, and means operable in timed relation to the operation of said devices to advance articles through the work holding means to successively position the articles in operative relation to each of said devices and for ejecting completed articles from the holding means.

4. In a metal working machine, a station comprising a plurality of work performing devices spaced from each other, means for holding a plurality of articles to be fashioned at said station with an edge of one article in juxtaposition to an edge of an adjacent article and with each article in registration with one of said devices, means for actuating the devices simultaneously to perform their respective operations on the articles in registration therewith, means operable in timed relation to the operation of said devices to release the articles in said holding means, and means operable in timed relation to said releasing means to advance articles through the holding means to successively position the articles in operative relation to each of the devices.

5. In a metal working machine, a station comprising a plurality of work performing devices spaced from each other, means for holding a plurality of articles to be fashioned at said station with an edge of one article in juxtaposition to an edge of an adjacent article and with each article in registration with one of said devices, means for actuating the devices simultaneously to perform their respective operations on the articles in registration therewith, means operable in timed relation to the operation of said devices to release the articles in said holding means, and means operable in timed relation to said releasing means to advance articles through the holding means by introducing a blank article into the holding means.

6. In a metal working machine, a station comprising a plurality of work performing devices spaced from each other, means for holding a plurality of articles to be fashioned at said station with an edge of one article in juxtaposition to an edge of an adjacent article and with each article in registration with one of said devices, means for actuating the devices simultaneously to perform their respective operations on the articles in registration therewith, and means operable in timed relation to the operation of said devices for advancing articles through the work holding means to successively position the articles in operative relation to each of said devices and for ejecting completed articles from the holding means, said last named means including loading mechanism for introducing blank articles into the holding means.

7. In a metal working machine, a station comprising a plurality of work performing devices spaced from each other, means for holding a plurality of articles to be fashioned at said station with an edge of one article in juxtaposition to an edge of an adjacent article and with each article in registration with one of said devices, means for actuating the devices simultaneously to perform their respective operations on the articles in registration therewith, means operable in timed relation to the operation of said devices for axially moving the holding means, means responsive to the aforesaid movement of the holding means to release the articles carried thereby, and means operable in timed relation to the releasing means for introducing a blank article into the holding means.

8. In a metal working machine, a station comprising a plurality of work performing devices spaced from each other, means for holding a plurality of articles to be fashioned at said station with an edge of one article in juxtaposition to an edge of an adjacent article and with each article in registration with one of said devices, means for actuating the devices simultaneously to perform their respective operations on the articles in registration therewith, means operable in timed relation to the operation of said devices for reciprocating the holding means, means responsive to movement of the holding means in a direction away from the station to release the articles and upon return movement of the holding means to clamp articles in the latter, and means operable in timed relation to releasing the articles for introducing a blank article into the holding means.

9. In a metal working machine, a plurality of work performing devices spaced from each other, means for holding a plurality of articles to be fashioned with an edge of one article in juxtaposition to an edge of an adjacent article and with each article in registration with one of said devices, means for actuating the devices simultaneously to perform their respective operations on the article in registration therewith, means operable in timed relation to the operation of said devices for reciprocating the holding means, means responsive to movement of the holding means out of registration with said devices to release the articles in the holding means and upon return movement of the holding means to clamp articles in the latter means, and means operable in timed relation to releasing the articles for advancing the latter in the holding means.

10. In a metal working machine, a station comprising a plurality of work performing devices spaced from each other, means for holding a plurality of articles to be fashioned at said station with an edge of one article in juxtaposition to an edge of an adjacent article and with each article in registration with one of said devices, means for actuating the devices simultaneously to perform their respective operations on the articles in registration therewith, means operable in timed relation to the operation of said devices for reciprocating the holding means, means responsive to movement of the holding means in a direction away from the station to release the articles and upon return movement of the holding means to clamp articles in the latter, and means operable in timed relation to releasing the articles for introducing a blank article into the holding means, said last named means also operable to advance articles through the holding means to successively position an article in registration with each of said devices.

11. In a metal working machine, a plurality of stations each comprising a plurality of work performing devices, a work holder having means for holding a plurality of articles to be fashioned at each station with an edge of one article in juxtaposition to an edge of an adjacent article and with each article in registration with one of the devices, means for actuating the devices simultaneously to perform their respective operations on the articles in registration therewith, and means operable in timed relation to the operation of said devices for advancing articles through the work holding means to provide for successively positioning the articles at each station in operative relation to each of the devices at the same station.

12. In a metal working machine, a plurality of stations each comprising a plurality of work performing devices, a work holder having means for holding a plurality of articles to be fashioned at each station with an edge of one article in juxtaposition to an edge of an adjacent article and with each article in registration with one of the devices, means for actuating the devices simultaneously to perform their respective operations on the articles in registration therewith, and means associated with each station operable in timed relation to the operation of the devices for introducing blank articles into the holding means and for advancing articles through the holding means to successively position the articles at each station in operative relation to each of the devices at the same station.

13. In a metal working machine, a grooving device and a drilling device spaced from the grooving device, means for holding a bushing in registration with each of said devices, means for actuating the devices to perform their respective functions on the bushings in operative relation thereto, and means operable in timed relation to the operation of said devices to introduce a blank bushing into the holding means in a position to register with one of said devices and to advance the bushing previously operated upon by the latter device the extent necessary to register the latter bushing with the other device.

14. In a metal working machine, a plurality of work performing devices spaced from each other, a work holder having a clamp for holding a plurality of articles to be fashioned with an article in registration with each device, means for actuating the devices to perform their respective operations on the articles in registration therewith, means operable in timed relation to the operation of said devices for releasing the clamp, and means operable subsequent to releasing the clamp to introduce a blank article into the clamp in a position to register with one of said devices and to advance the article previously fashioned by the latter device the extent required to register the latter article with the device adjacent the device aforesaid.

15. In a metal working machine, a plurality of work performing devices spaced from each other, a work holder having a clamp for holding a plurality of articles to be fashioned with an article in registration with each device, means for actuating the devices to perform their respective operations on the articles in registration therewith, means operable in timed relation to the operation of said devices for reciprocating the holder, means responsive to movement of the holder out of registration with the devices to release the clamp and upon return movement of the holder to actuate the clamp, and means operable subsequent to releasing the clamp to introduce a blank article into the clamp in a position to register with one of said devices and to advance the article previously fashioned by the latter device the extent required to register the latter article with the device adjacent the device aforesaid upon the said return movement of the holder.

16. In a metal working machine, a grooving device, a drilling device spaced from the grooving device, a work holder having a clamp for holding a plurality of bushings to be fashioned with a bushing in registration with each of said devices, means for actuating the devices simultaneously to perform their respective operations on the bushings in registration therewith, means operable in timed relation to the operation of said devices for releasing the clamp, and means operable subsequent to releasing the clamp to introduce a bushing blank into the clamp in a position to register with one of the devices and to advance the bushing previously fashioned by the latter device the extent required to register the latter bushing with the device aforesaid, said last named means also operable to eject the bushing completed by the last named device from the clamp during the interval the latter is released.

17. In a machine for performing operations on bushing blanks, means for holding a plurality of bushing blanks to be fashioned with the blanks in axial alignment, a plurality of work performing devices spaced from each other axially of the bushing blanks and so positioned with respect to the work holding means that at least one of the devices registers with each bushing blank, means for actuating the devices simultaneously to perform their respective operations on the bushing blanks in registration therewith, and means operable in timed relation to the operation of the devices for advancing the blanks through the holding means to successively position the same in registration with each of said devices.

18. In a machine of the class described, a work holder, a pair of work chutes adjacent the holder, and means for transferring work simultaneously from the chutes to the holder including a pair of plungers supported on diametrically opposed sides of the work holder, and means for actuating both plungers simultaneously including a cam, a rockshaft, a bell crank lever secured to said rockshaft, a follower for the cam aforesaid carried by one arm of the bell crank lever, a spring connected to the other arm of said bell crank lever and maintaining engagement between the follower and cam, a pair of levers fixed to the rockshaft, and links terminally connected to said levers and plungers.

19. In a machine of the class described, a reciprocating work holder, and loading mechanism for said holder including a pair of plungers supported on diametrically opposed sides of the axis of reciprocation of the work holder, and means for actuating both plungers simultaneously including a cam, a rockshaft, a bell crank lever secured to said rockshaft, a follower for the cam carried by one arm of the bell crank lever, yieldable means connected to the other arm of the bell crank lever and maintaining engagement between the follower and cam, a pair of levers fixed to the rockshaft, and links terminally connected to said levers and plungers.

20. In a machine of the class described, a work holder, a pair of work chutes adjacent said holder, means for transferring work from the chutes to said holder, and means for advancing work in the chutes toward said transfer means including plungers in the chutes, one in each chute, a pair of rockshafts, arms terminally connected to said rockshafts and plungers, a cam between said rockshafts, cam followers engaging said cams, and levers terminally connected to said followers and rockshafts.

21. In a machine of the class described, means for holding a plurality of bushing blanks in registration with one work station, and devices at said station operable simultaneously to perform different operations on each of said blanks.

22. In a machine of the class described, means for holding a plurality of bushing blanks in registration with each of a plurality of work stations, and devices at each of said stations operable simultaneously to perform different operations on each of said blanks.

23. In a machine of the class described, a reciprocating work holder having means for holding two aligned bushing blanks in registration with one work station, and devices at said station operable simultaneously to perform different operations on said aligned blanks.

GEORGE F. YAGER.
OLIVER J. HEATH.
HAROLD E. WAGNER.